United States Patent [19]
Inaba et al.

[11] B 3,923,803
[45] Dec. 2, 1975

[54] 2(1H)-QUINOZALINONES AND PROCESS THEREFOR

[75] Inventors: Shigeho Inaba, Takarazuka; Kei Takahashi, Takatsuki; Michihiro Yamamoto, Takarazuka; Kazuo Mori, Kobe; Kikuo Ishizumi, Minoo; Hisao Yamamoto, Nishinomiya, all of Japan

[73] Assignee: Sumitomo Chemical Company, Limited, Osaka, Japan

[22] Filed: May 12, 1972

[21] Appl. No.: 252,947

[44] Published under the Trial Voluntary Protest Program on January 28, 1975 as document no. B 252,947.

Related U.S. Application Data

[63] Continuation of Ser. No. 840,856, July 10, 1969, abandoned.

[30] Foreign Application Priority Data
July 18, 1968  Japan.................................. 43-50982
July 18, 1968  Japan.................................. 43-50983
Oct. 18, 1968  Japan.................................. 43-76377

[52] U.S. Cl..................... 260/251 QB, 260/256.4 Q, 260/256.5 R, 260/562 B, 424/251
[51] Int. Cl.².......................................... C07D 239/82
[58] Field of Search ... 260/251 QB, 256.4 Q, 256.5 R

[56] References Cited
UNITED STATES PATENTS
3,723,432   3/1973   Ott.............................. 260/251 QB FOREIGN PATENTS OR APPLICATIONS
1,520,743   4/1968   France

*Primary Examiner*—Raymond V. Rush
*Attorney, Agent, or Firm*—Stevens, Davis, Miller & Mosher

[57] ABSTRACT

2(1H)-Quinazolinone derivatives or salts thereof which are useful as anti-inflammatory or analgesic agents and represented by the formula,

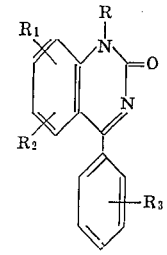

wherein R is hydroden halogen, lower alkyl, lower alkenyl, aralkyl, lower alkoxyalkyl or di-lower-alkylaminoalkyl, each of $R_1$, $R_2$ and $R_3$ is hydrogen, halogen, lower alkyl, lower alkoxy, nitro, lower alkylthio, lower alkylsulfonyl or trifluoromethyl, can be produced advantageously by reacting a novel trihaloacetamidobenzophenone derivative represented by the formula, wherein R, $R_1$, $R_2$ and $R_3$ have the same meanings as defined above, and $X_1$, $X_2$ and $X_3$ are halogen atoms, with ammonia. The trihaloacetamidobenzophenone derivative is produced by reacting a 2-aminobenzophenone derivative represented by the formula, wherein R, $R_1$, $R_2$ and $R_3$ have the same meanings as defined above, with a trihaloacetic acid or its reactive derivative.

3 Claims, No Drawings

2(1H)-QUINOZALINONES AND PROCESS THEREFOR

This is a continuation of application Ser. No. 840,856 filed July 10, 1969, now abandoned.

This invention relates to a novel process for producing quinazoline derivatives. More particularly, the invention pertains to a novel process for producing 2(1H)-quinazolinone derivatives represented by the general formula.

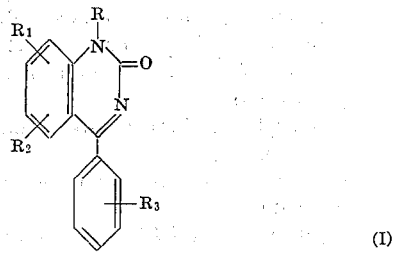

(I)

wherein R is selected from the group consisting of hydrogen, $C_{1-4}$ alkyl, $C_{1-4}$ alkenyl, aralkyl, $(C_{1-4}$ alkoxy) $C_{1-4}$ alkyl or di($C_{1-4}$ alkyl) amino ($C_{1-4}$ alkyl); $R_1$, $R_2$ and $R_3$ are each selected from the group consisting of hydrogen, halogen, $C_{1-4}$ alkyl, $C_{1-4}$ alkoxy, nitro, $C_{1-4}$ alkylthio, $C_{1-4}$ alkylsulfonyl or trifluoromethyl. The quinazoline derivatives represented by the aforesaid general formula (I), which include novel compounds, have excellent pharmacological properties particularly as anti-inflammatory and analgesic agents; they are also useful as intermediates for preparing other medicines. Thus the present invention offers a new and useful process for producing commercially such valuable compounds.

A few processes for producing some of these 2(1H)-quinazolinone derivatives have heretofore been described. For instance, it is known to obtain the 2(1H)-quinazolinone derivative by fusing a 2-aminobenzophenone derivative with urea, and further, if desired, alkylating the resulting compound. (T. S. Sulkowski and S. J. Childress, J. Org. Chem. 27, 4424 (1962))

Contrary to these procedures, we have found, unexpectedly, that 2(1H)-quinazolinone derivatives of the formula (I) can be smoothly and economically prepared in high yields and in high purity by treating with ammonia a trihaloacetamidobenzophenone derivative of the formula.

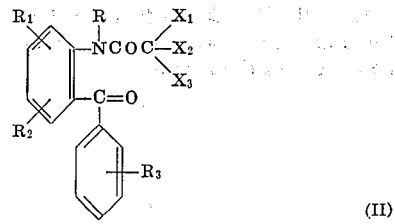

(II)

wherein $X_1$, $X_2$ and $X_3$ are same or different halogen atoms; and R, $R_1$, $R_2$ and $R_3$ are as defined above in the formula (I).

Such process for converting a trihaloacetamidobenzophenone derivative into a quinazolinone derivative has not heretofore been described or suggested in any literature. This new and useful process thus differs markedly from the known methods and represents an improvement thereover.

Among these compounds produced by the above-mentioned process, the quinazolinone derivatives represented by the general formulas,

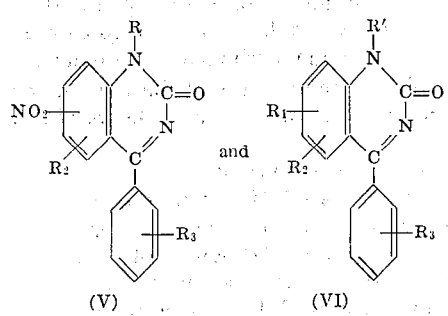

wherein R, $R_1$, $R_2$ and $R_3$ are as defined above, and R' is $C_{1-4}$ alkoxy $C_{1-4}$ alkyl, are novel. They are found to possess prominent anti-inflammatory effects in animal tests with low toxicity and to be also useful as intermediates for synthesis of other quinazolinone derivatives. Illustratively, 1-methyl-4-phenyl-6-nitro-2(1H)-quinazolinone, shows remarkable inhibitory action for carrageenin-induced edema in rat, and inhibits the edema by 32.9% at 50 mg/kg (per os), 50.5% at 100 mg/kg (per os) and 60.6% at 400 mg/kg (per os), while no toxic symptoms are observed and occult bleeding is negative in feces after oral administration of 1,000 mg/kg in rat. The anti-inflammatory activity of this compound is 4 times higher than that of 1,2-diphenyl-3,5-dioxo-4-n-butylpyrazolidine (phenylbutazone), and the acute, subacute and chronic toxicities are much lower than those of phenylbutazone.

Thus, one object of the present invention is to provide a novel process for producing commercially such valuable quinazolinone derivatives.

Another object of the invention is to provide novel quinazolinone derivatives excellent in anti-inflammatory effects.

Other objects of the present invention will be apparent from the following description.

In order to accomplish these objects, the present invention provides a process for producing quinazolinone derivatives represented by the aforesaid formula (I), which comprises treating a trihaloacetamidobenzophenone derivative represented by the general formula (II) with ammonia.

The trihaloacetamidobenzophenone derivatives of the formula (II) which are employed in the present invention are novel compounds. They can be, for example, prepared by contacting a corresponding 2-aminobenzophenone derivative with a trihaloacetic acid or its reactive derivative.

In preparing the quinazolinone derivatives according to this invention, a trihaloacetamidobenzophenone derivative represented by the aforesaid general formula (II) is reacted with ammonia in the presence of a solvent. As the solvent employed for this process alcohols are desirable. For instance, it is suitably selected from such alcohols as methanol, ethanol, isopropyl alcohol, tertiary-butyl alcohol and the like.

Ammonia is used in the stoichiometric amount or more, and is added to the reaction mixture as gaseous, alcoholic or liquid ammonia. Generally, the reaction proceeds at room temperature, but the temperature may be higher or lower, if necessary, to effect the desired control of the reaction.

When R is hydrogen, the quinazolinone derivative obtained according to the above-mentioned process may also exist in the form of the corresponding 2- hydroxyquinazoline derivative because of the formation of its keto-enol tautomerism. Accordingly, the quinazoline derivative may be formed as various salts by treating with suitable base. Examples of the base include sodium hydroxide, potassium hydroxide sodium carbonate, potassium carbonate and the like.

According to the process of the present invention, there are produced such quinazolinone derivatives as shown below.

4-phenyl-2(1H)-quinazolinone
4-phenyl-5-chloro-2(1H)-quinazolinone
4-phenyl-6-chloro-2(1H)-quinazolinone
4-phenyl-7-chloro-2(1H)-quinazolinone
4-phenyl-6-bromo-2(1H)-quinazolinone
4-phenyl-6-methyl-2(1H)-quinazolinone
4-phenyl-6-methoxy-2(1H)-quinazolinone
4-phenyl-6-nitro-2(1H)-quinazolinone
4-phenyl-6-methythio-2(1H)-quinazolinone
4-phenyl-6-methylsulfonyl-2(1H)-quinazolinone
4-phenyl-6-trifluoromethyl-2(1H)-quinazolinone
4-phenyl-6-chloro-8-nitro-2(1H)-quinazolinone
4-phenyl-6,8-dichloro-2(1H)-quinazolinone
4-phenyl-6,7-dimethoxy-2(1H)-quinazolinone
4-(o-chlorophenyl)-6-chloro-2(1H)-quinazolinone
4-(o-chlorophenyl)-6-nitro-2(1H)-quinazolinone
4-(m-chlorophenyl)-6-methoxy-2(1H)-quinazolinone
4-(o-fluorophenyl)-6-chloro-2(1H)-quinazolinone
4-(o-fluorophenyl)-6-nitro-2(1H)-quinazolinone
4-(p-methoxyphenyl)-6-chloro-2(1H)-quinazolinone
4-(p-tolyl)-6-chloro-2(1H)-quinazolinone
4-(o-tolyl)-6-chloro-2(1H)-quinazolinone
4-(p-nitrophenyl)-6-nitro-2(1H)-quinazolinone
1-methyl-4-phenyl-2(1H)-quinazolinone
1-methyl-4-phenyl-5-chloro-2(1H)-quinazolinone
1-methyl-4-phenyl-6-chloro-2(1H)-quinazolinone
1-methyl-4-phenyl-7-chloro-2(1H)-quinazolinone
1-methyl-4-phenyl-6-bromo-2(1H)-quinazolinone
1-methyl-4-phenyl-6-fluoro-2(1H)-quinazolinone
1-methyl-4-phenyl-6-chloro-8-methyl-2(1H)-quinazolinone
1-methyl-4-phenyl-6-methoxy-2(1)-quinazolinone
1-methyl-4-phenyl-6-methylthio-2(1H)-quinazolinone
1-methyl-4-phenyl-6-methylsulfonyl-2(1H)-quinazolinone
1-methyl-4-phenyl-6-trifluoromethyl-2(1H)-quinazolinone
1-methyl-4-phenyl-6,8-dichloro-2(1H)-quinazolinone
1-methyl-4-(o-fluorophenyl)-6-nitro-2(1H)-quinazolinone
1-methyl-4-(o-chlorophenyl)-6-nitro-2(1H)-quinazolinone
1-methyl-4-(m-cholorophenyl)-6-nitro-2(1H)-quinazolinone
1-methyl-4-(p-chlorophenyl)-6-nitro-2(1H)-quinazolinone
1-methyl-4-(o-tolyl)-6-nitro-2(1H)-quinazolinone
1-ethyl-4-phenyl-6-nitro-2(1H)-quinazolinone
1-propyl-4-phenyl-6-nitro-2(1H)-quinazolinone
1-methyl-4-(p-methoxyphenyl)-6-chloro-2(1H)-quinazolinone
1-methyl-4-(o-chlorophenyl)-6-chloro-2(1H)-quinazolinone
1-methyl-4-(p-chlorophenyl)-6-chloro-2(1H)-quinazolinone
1-methyl-4-(m-chlorophenyl)-6-chloro-2(1H)-quinazolinone
1-methyl-4-(m-chlorophenyl)-6-methoxy-2(1H)-quinazolinone
1-methyl-4-(o-fluorophenyl)-6-chloro-2(1H)-quinazolinone
1-methyl-4-(p-fluorophenyl)-6-chloro-2(1H)-quinazolinone
1-ethyl-4-phenyl-6-chloro-2(1H)-quinazolinone
1-ethyl-4-(o-tolyl)-6-chloro-2(1H)-quinazolinone
1-isopropyl-4-phenyl-6-chloro-2(1H)-quinazolinone
1-isopropyl-4-phenyl-6-bromo-2(1H)-quinazolinone
1-isopropyl-4-phenyl-6-methoxy-2(1H)-quinazoline
1-isopropyl-4-phenyl-6-nitro-2(1H)-quinazolinone
1-isopropyl-4-phenyl-6-trifluoromethyl-2(1H)-quinazolinone
1-isopropyl-4-(o-fluorophenyl)-6-chloro-2(1H)-quinazolinone
1-isopropyl-4-(p-chlorophenyl)-6-chloro-2(1H)-quinazolinone
1-isopropyl-4-(o-tolyl)-6-chloro-2(1H)-quinazolinone
1-isopropyl-4-(p-tolyl)-6-chloro-2(1H)-quinazolinone
1-isopropyl-4-(o-chlorophenyl)-6-methoxy-2(1H)-quinazolinone
1-isobutyl-4-phenyl-6-chloro-2(1H)-quinazolinone
1-n-butyl-4-phenyl-6-chloro-2(1H)-quinazolinone
1-allyl-4-phenyl-6-chloro-2(1H)-quinazolinone
1-benzyl-4-phenyl-6-chloro-2(1H)-quinazolinone
1-ethoxyethyl-4-(o-fluorophenyl)-6-chloro-2(1H)-quinazolinone
1-($\beta$-diethylaminoethyl)-4-(o-fluorophenyl)-6-chloro-2(1H)-quinazolinone
1-($\beta$-diethylaminoethyl)-4-phenyl-6-chloro-2(1H)-quinazolinone In the next place, a conventional process for preparing the trihaloacetamidobenzophenone derivative of the formula (II) is explained below.

The 2-aminobenzophenone derivative of the formula,

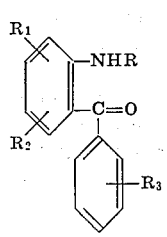

(III)

wherein R, $R_1$, $R_2$ and $R_3$ have the same meanings defined above in formula (I), is reacted with a trihaloacetic acid of the formula,

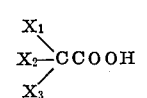

(IV)

wherein $X_1$, $X_2$ and $X_3$ have the same meanings defined above in formula (II), or its reactive derivative such as acid halides, acid anhydrides, esters and the like. In practicing this process, trihaloacetyl halides such as chloride and bromide are particularly useful.

The reaction may be carried out in the presence or absence of an inert solvent with a condensing agent or without it. The choice of the solvent depends on the trihaloacetic acid or its reactive derivative employed, the solvent inert towards the two starting materials can be preferably used. Available inert solvents are, for example, benzene, toluene, xylene, ether, tetrahydrofuran, methylene chloride, chloroform and the like. However, when the trihaloacetic acid derivative or the condensing agent employed is liquid, the reaction is carried out in the materials as a solvent without employment of other reaction medium. In the case of acid halides, it is desirable to carry out the reaction in the presence of a condensing agent, which includes an inorganic base such as sodium hydroxide, potassium hydroxide, sodium carbonate and potassium carbonate, or an organic base such as pyridine, triethyl amine and the like. Excess of the 2-aminobenzophenone derivative is also used as a base. If a free trihaloacetic acid is used, suitable condensing agents are, in particular, dicyclohexylcarbodiimide, N-cyclohexyl-N'-morpholinoethylcarbodiimide or phosphorus trichloride.

In accordance with the above process, there are obtained, for example, following trihaloacetamidobenzophenone derivatives.

2-trichloroacetamidobenzophenone
2-trichloroacetamido-4-chlorobenzophenone
2-trichloroacetamido-5-chlorobenzophenone
2-trichloroacetamido-6-chlorobenzophenone
2-trichloroacetamido-5-bromobenzophenone
2-trichloroacetamido-5-methylbenzophenone
2-trichloroacetamido-5-methoxybenzophenone
2-trichloroacetamido-5-nitrobenzophenone
2-trichloroacetamido-5-methylthiobenzophenone
2-trichloroacetamido-5-methylsulfonylbenzophenone
2-trichloroacetamido-5-trifluoromethylbenzophenone
2-trichloroacetamido-5,2'-dichlorobenzophenone
2-trichloroacetamido-5-chloro-2'-fluorobenzophenone
2-trichloroacetamido-5,4'-dichlorobenzophenone
2-trichloroacetamido-5-chloro-2'-methylbenzophenone
2-trichloroacetamido-5-chloro-4'-methoxybenzophenone
2-trichloroacetamido-4,5-dimethoxybenzophenone
2-trichloroacetamido-5-methoxy-3'-chlorobenzophenone
2-trichloroacetamido-5,4'-dinitrobenzophenone
2-trichloroacetamido-5,2'-dinitrobenzophenone
2-trichloroacetamido-5-nitro-2'-chlorobenzophenone
2-trichloroacetamido-5-nitro-2'-fluorobenzophenone
2-trichloroacetamido-5-chloro-4'-methylbenzophenone
2-tribromoacetamidobenzophenone
2-tribromoacetamido-5-chlorobenzophenone
2-trifluoroacetamido-5-chlorobenzophenone
2-(N-methyl-trichloroacetamido)benzophenone
2-(N-methyl-trichloroacetamido)-5-chlorobenzophenone
2-(N-methyl-trichloroacetamido)-5-bromobenzophenone
2-(N-methyl-trichloroacetamido)-5-methoxybenzophenone
2-(N-methyl-trichloroacetamido)-5-methylthiobenzophenone
2-(N-methyl-trichloroacetamido)-5-methylsulfonylbenzophenone
2-(N-methyl-trichloroacetamido)-5-nitrobenzophenone
2-(N-methyl-trichloroacetamido)-5,3'-dichlorobenzophenone
2-(N-methyl-trichloroacetamido)-5-methoxy-3'-chlorobenzophenone
2-(N-methyl-trichloroacetamido)-5-nitro-2'-fluorobenzophenone
2-(N-methyl-trichloroacetamido)-5-chloro-4'-fluorobenzophenone
2-(N-methyl-trichloroacetamido)-5-nitro-3-'-chlorobenzophenone
2-(N-methyl-trichloroacetamido)-5-nitro-2'-methylbenzophenone
2-(N-methyl-trichloroacetamido)-2'-chloro-5-nitrobenzophenone
2-(N-ethyl-trichloroacetamido)-5-nitrobenzophenone
2-(N-methyl-trichloroacetamido)-5,2'-dichlorobenzophenone
2-(N-methyl-trichloroacetamido)-5-chloro-2'-fluorobenzophenone
2-(N-allyl-trichloroacetamido)benzophenone
2-(N-ethyl-trichloroacetamido)-5-chloro-2'-methylbenzophenone
2-(N-isopropyl-trichloroacetamido)-5-chlorobenzophenone
2-(N-isopropyl-trichloroacetamido)-5-bromobenzophenone
2-(N-isopropyl-trichloroacetamido)-5-methoxybenzophenone
2-(N-isopropyl-trichloroacetamido)-5-nitrobenzophenone
2-(N-isopropyl-trichloroacetamido)-5-trifluoromethylbenzophenone
2-(N-isopropyl-trichloroacetamido)-2'-fluoro-5-chlorobenzophenone
2-(N-isopropyl-trichloroacetamido)-4',5-dichlorobenzophenone
2-(N-isopropyl-trichloroacetamido)-4'-methyl-5-chlorobenzophenone
2-(N-isopropyl-trichloroacetamido)-2'-methyl-5-chlorobenzophenone
2-(N-isopropyl-trichloroacetamido)-2'-chloro-5-methoxybenzophenone
2-(N-isobutyl-trichloroacetamido)-5-chlorobenzophenone
2-(N-allyl-trichloroacetamido)-5-chlorobenzophenone
2-(N-benzyl-trichloroacetamido)-5-chlorobenzophenone
2-(N-ethoxyethyl-trichloroacetamido)-5-chloro-2'-fluorobenzophenone
2-[N-(β-diethylaminoethyl)trichloroacetamido]-5-chloro-2'-fluorobenzophenone This invention is further disclosed in the following Examples of preferred embodiments thereof, which are presented for purposes of illustration and are not intended to limit the scope of the invention.

EXAMPLE 1

Step A

A solution of 5.5 g of trichloroacetyl chloride in 20 ml. of dry benzene is added dropwise to a solution of 13.9 g of 2-amino-5-chlorobenzophenone in 40 ml. of dry benzene with stirring and cooling. After the mixture is stirred for 2 hours under ice-cooling, the mixture is filtered, and the filtrate is concentrated in vacuo to dryness. The oily residue is crystallized on treatment with 20 ml. of methanol to give 8.7 g of 2-trichloroacetamido-5-chlorobenzophenone, m.p. 90.5° – 92.5°C. Recrystallization from a mixture of ethanol and benzene gives colorless crystals, m.p. 93.0° – 94.0°C.

Step B

To a solution of 5.7 g of 2-trichloroacetamido-5-chlorobenzophenone in 200 ml. of methanol is added 50 g of 10% methanolic ammonia, and the mixture is left at room temperature. The solution is concentrated in vacuo to dryness, and the residue is washed with 30 ml. of ether, and water successively and dried to give 4-phenyl-6-chloro-2(1H)-quinazolinone, m.p. >300°C.

To a suspension of 1.0 g of the compound in 30 ml. of ethanol is added 10 g of 10% aqueous sodium hydroxide. The mixture is dissolved by heating, and cooled to give the sodium salt as yellow needles, m.p. >300°C.

EXAMPLE 2

Step A

A solution of 1.8 g of trichloroacetyl chloride in 5 ml. of benzene is added dropwise to a mixture of 2.1 g of 2-amino-5-nitrobenzophenone, 40 ml. of benzene, 40 ml. of methylene chloride and 2 ml. of pyridine, and the mixture is stirred at room temperature for 1 hour. The reaction mixture is washed with water and dried over sodium sulfate, and the solvent is removed in vacuo. The residue is crystallized from 5 ml. of ethanol to give 2.5 g of 2-trichloroacetamido-5-nitrobenzophenone. Recrystallization from a mixture of ethanol and chloroform gives prisms, m.p. 119°C.

Step B

To a solution of 2.3 g of 2-trichloroacetamido-5-nitrobenzophenone in 200 ml of tertiary-butyl alcohol is added 1.7 g of 10% methanolic ammonia, and the mixture is left at room temperature for 2 days. The solvent is removed under reduced pressure, and the residue is washed with 30 ml of methylene chloride. Thus 4-phenyl-6-nitro-2(1H)-quinazolinone is obtained as colorless crystals, m.p.>300°C.

EXAMPLE 3

Step A

To a mixture of 12.1 g of 2-amino-5-nitrobenzophenone, 120 ml of methylene chloride and 10 ml. of pyridine is added dropwise 10.9 g of trichloroacetyl chloride at room temperature. After the mixture is stirred for 2 hrs., 50 ml. of water is added with stirring. The organic layer is separated, dried over sodium sulfate and evaporated under reduced pressure. The red oily residue is crystallized on treatment with 20 ml. of ethanol under cooling to give 15.1 g of 2-trichloroacetamido-5-nitrobenzophenone, m.p. 116° – 117.5°C. Recrystallization from a mixture of ethanol and chloroform gives lightbrown crystals, m.p. 118.0° – 119.0°C.

Step B

A solution of 3.9 g of 2-trichloroacetamido-5-nitrobenzophenone in 100 ml. of tertiary-butyl alcohol is heated with 3.4 g of 10% ethanolic ammonia at about 120°C. for 3 hours in a sealed tube. Then the mixture is concentrated in vacuo to dryness. The residue is washed with methylene chloride, and dried to give 4-phenyl-6-nitro-2(1H)-quinazolinone.

EXAMPLE 4

Step A

To a solution of 8.6 g of 2-methylamino-5-chlorobenzophenone in 100 ml. of ether is added dropwise 7.6 g of trichloroacetyl chloride at room temperature. The mixture is stirred under reflux for 4 hours. After cooling, the reaction mixture is washed with water. The ethereal layer is separated, dried over sodium sulfate and evaporated under reduced pressure. To the oily residue is added 30 ml. of ethanol and 10 ml. of petroleum ether. The precipitate is collected by filteration and dried to give 10.8 g of 2-(N-methyl-trichloroacetamido)-5-chlorobenzophenone, m.p. 116° – 117°C. Recrystallization from ethanol gives 10.3 g of colorless crystals, m.p. 117° – 118°C.

Step B

A solution of 2.0 g of 2-(N-methyl-trichloroacetamido)-5-chlorobenzophenone in 100 ml. of ethanol is saturated with ammonia under cooling, and the mixture is left at room temperature. The mixture is concentrated in vacuo to dryness. The residue is washed with 20 ml. of ether, and dried to yield 1-methyl-4-phenyl-6-chloro-2(1H)-quinazolinone, m.p. 220.5° – 221.0°C.

Recrystallization from a mixture of chloroform and methanol gives slight yellow crystals, m.p. 221° – 220°C.

EXAMPLE 5

Using the procedure described in Example 1, but replacing 2-amino-5-chlorobenzophenone employed in Step A by 2-amino-6-chlorobenzophenone, there is obtained 4-phenyl-5-chloro-2(1H)-quinazolinone, m.p. 284°C.

EXAMPLE 6

Using the procedure described in Example 1, but replacing 2-amino-5-chlorobenzophenone employed in step A by 2-amino-5-methoxybenzophenone, there is obtained 4-phenyl-6-methoxy-2(1H)-quinazolinone, m.p. 287°C.

EXAMPLE 7

In accordance with the procedure described in Example 1, but starting with 2-amino-5-methylbenzophenone, 2-amino-5-methylsulfonylbenzophenone, 2-amino-2',5-dichlorobenzophenone in place of 2-amino-5-chlorobenzophenone, there is obtained 4-phenyl-6-methyl-2(1H)-quinazolinone, 4-phenyl-6-methylsulfonyl-2-(1H)-quinazolinone and 4-o-chlorophenyl-6-chloro-2(1H)-quinazolinone respectively.

EXAMPLE 8

Using the procedure similar to that described in Example 4, but replacing 2-methylamino-5-chlorobenzophenone employed Step A by 2-methylamino-3'-chloro-5-methoxybenzophenone, there is obtained 1-methyl-4-(m-chlorophenyl)-6-methoxy-2(1H)-quinazolinone, m.p. 199° – 200°C.

Similarly, using the procedure similar to that described in Example 4, but replacing 2-methylamino-5-chlorobenzophenone employed Step A by 2-ethylamino-2'-methyl-5-chlorobenzophenone, there is obtained 1-ethyl-4-(o-tolyl)-6-chloro-2(1H)-quinazolinone, m.p. 174° – 175°C.

Similarly the following compounds are obtained. 1-methyl-4-phenyl-6-methoxy-2(1H)-quinazolinone, m.p. 167° – 168°C., 1-benzyl-4-phenyl-6-chloro-2(1H)-quinazolinone, m.p. 183° – 184°C., 1-methyl-4-phenyl- 6-trifluoromethyl-2(1H)-quinazolinone, m.p. 199° – 201°C., 1-ethyl-4-phenyl-6-chloro-2(1H)-quinazolinone, m.p. 167° – 168°C., 1-methyl-4-(p-chlorophenyl)-6-chloro-2(1H)-quinazolinone, m.p. 221° – 222°C.

EXAMPLE 9

Using the procedure similar to that described in Example 4, but replacing 2-methylamino-5-chlorobenzophenone by 2-isopropylamino-5-chlorobenzophenone, there is obtained 1-isopropyl-4-phenyl-6-chloro-2(1H)-quinazolinone.

Example 10

Step A

A solution of 4.0 g of trichloroacetylchloride in 10 ml. of isopropylether is added dropwise to a solution of 4.9 g of 2-allylamino-5-chlorobenzophenone in 50 ml. of isopropylether at room temperature. The mixture is stirred under reflux for 4 hours. After cooling, the reaction mixture is washed with water. The ethereal layer is separated, dried over sodium sulfate and evaporated under reduced pressure. The yellow residue is crystallized from 80 ml. of methanol. Thus 3.5 g of 2-(N-allyltrichloroacetamido)-5-chlorobenzophenone is obtained as slight yellow crystals, m.p. 131.5° – 132.5°C.

Step B

To a solution of 2.1 g of 2-(N-allyltrichloroacetamido)-5-chlorobenzophenone in a mixture of 20 ml. of chloroform and 50 ml. of ethanol is added 5.2 g of 5% ethanolic ammonia, and the mixture is left at room temperature for 4 days. The solvent is removed under reduced pressure. The residue is washed with 20 ml. of ether and dried to give 0.71 g of 1-allyl-4-phenyl-6-chloro-2(1H)-quinazolinone, m.p. 185.0° – 186.0°C.

EXAMPLE 11

Step A

To a mixture of 5.0 g of 2-ethoxyethylamino-5-chloro-2'-fluorobenzophenone, 40 ml. of methylene chloride and 3 ml. of pyridine is added dropwise a solution of 7.2 g of trichloroacetylchloride in 10 ml. of methylenechloride at room temperature. The mixture is stirred under reflux for 6 hours. After cooling, the reaction mixture is washed with water. The organic layer is separated, dried over sodium sulfate and concentrated in vacuo. The residual oil is chromatographed on a column of silica gel eluting with benzene to give 3.2 g of 2(N-ethoxyethyl trichloro acetamido)-5-chloro-2'-fluorobenzophenone as yellow oil.

Step B

To a solution of 2.4 g of 2-(N-ethoxyethyl-trichloroacetamido)-5-chloro-2'-fluorobenzophenone in 20 ml. of ethanol is added 30 ml. of ethanol saturated with ammonia. The mixture is left at room temperature for 17 hours and the solution is concentrated in vacuo. The oily residue is crystallized on treatment with 10 ml. of isopropylether to give 1-ethoxyethyl-4-(o-fluorophenyl)-6-chloro-2(1H)-quinazolinone, m.p. 147.0° – 148.0°C.

Recrystallization from ethanol gives colorless needles, m.p. 151.0°–152.0°C.

Similarly, using the procedure described in Example 11, but replacing 2-ethoxyethylamino-5-chloro-2'-fluorobenzophenone by 2-(β-diethylaminoethyl)amino-5-chloro-2'-fluorobenzophenone, there is obtained 1-(β-diethylaminoethyl)-4-(o-fluorophenyl)-6-chloro-2(1H)-quinazolinone hydrochloride, which is recrystallized from ethanol to give colorless crystals, m.p. 223° – 224°C.

What is claimed is:

1. A process for producing a quinazoline of the formula

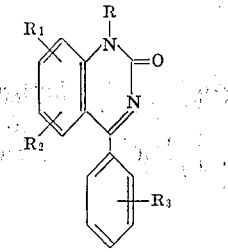

wherein R is hydrogen, $C_{1-4}$ alkyl, $C_2-C_4$ alkenyl, benzyl, ($C_{1-4}$ alkoxy) $C_{1-4}$ alkyl or di($C_{1-4}$ alkyl) amino ($C_{1-4}$ alkyl); $R_1$, $R_2$ and $R_3$ are each selected from the group consisting of hydrogen, halogen, $C_{1-4}$ alkyl, $C_{1-4}$ alkoxy, nitro, $C_{1-4}$ alkylthio, $C_{1-4}$ alkylsulfonyl and a trifluoromethyl group, which comprises contacting with ammonia a trihaloacetamidobenzophenone of the formula

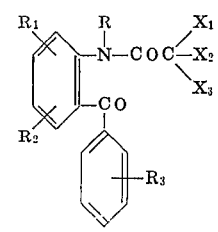

wherein each of $X_1$, $X_2$ and $X_3$ is independently a halogen atom; and R, $R_1$, $R_2$ and $R_3$ are as defined above.

2. A process according to claim 1 wherein R is benzyl.

3. A process for preparing a quinazoline of the formula

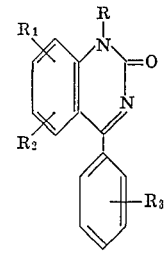

wherein R is hydrogen, $C_{1-4}$ alkyl, $C_2-C_4$ alkenyl, benzyl, ($C_{1-4}$ alkoxy) $C_{1-4}$ alkyl or a di($C_{1-4}$ alkyl) amino ($C_{1-4}$ alkyl); $R_1$, $R_2$ and $R_3$ are each selected from the group consisting of hydrogen, halogen, $C_{1-4}$ alkyl, $C_{1-4}$ alkoxy, nitro, $C_{1-4}$ alkylthio, $C_{1-4}$ alkylsulfonyl and a trifluoromethyl group, which comprises contacting a 2-amino-benzophenone of the formula

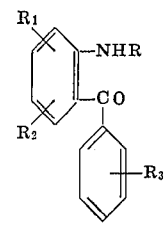

wherein R, R₁, R₂ and R₃ are as defined above, with a trihaloacetic acid of the formula
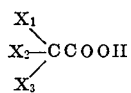
wherein each of $X_1$, $X_2$ and $X_3$ is independently halogen or acid halide or anhydride thereof, and then contacting with ammonia the resulting trihaloaceticacetamidobenzophenone of the formula
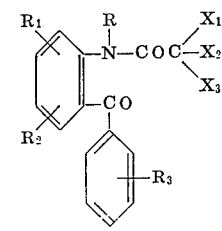
wherein $X_1$, $X_2$, $X_3$, R, $R_1$, $R_2$ and $R_3$ are as defined above.
* * * * *